United States Patent
Dhutia et al.

(10) Patent No.: US 12,499,262 B2
(45) Date of Patent: Dec. 16, 2025

(54) REAL-TIME DATA EVALUATION FOR MODEL TRAINING AND EXECUTION

(71) Applicant: Capital One Services, LLC, McLean, VA (US)

(72) Inventors: Devansh Dhutia, Ashburn, VA (US); Akshina Trentacoste, Arlington, VA (US); Obaidur Rehman Khan, Herndon, VA (US); Archana Santhiraj, Chantilly, VA (US)

(73) Assignee: Capital One Services, LLC, McLean, VA (US)

( * ) Notice: Subject to any disclaimer, the term of this patent is extended or adjusted under 35 U.S.C. 154(b) by 77 days.

(21) Appl. No.: 18/626,256

(22) Filed: Apr. 3, 2024

(65) Prior Publication Data
US 2025/0315541 A1   Oct. 9, 2025

(51) Int. Cl.
*G06F 21/62* (2013.01)
*G06F 21/55* (2013.01)
*G06F 16/903* (2019.01)
*G06F 16/9032* (2019.01)
*G06F 16/9038* (2019.01)

(52) U.S. Cl.
CPC .......... *G06F 21/6218* (2013.01); *G06F 21/55* (2013.01); *G06F 16/90332* (2019.01); *G06F 16/90335* (2019.01); *G06F 16/9038* (2019.01); *G06F 21/6245* (2013.01); *G06F 21/6254* (2013.01)

(58) Field of Classification Search
None
See application file for complete search history.

(56) References Cited

U.S. PATENT DOCUMENTS

| | | | |
|---|---|---|---|
| 11,803,448 B1 * | 10/2023 | Pani | G06F 9/5038 |
| 12,204,474 B2 * | 1/2025 | Hillel | G06F 17/16 |

(Continued)

FOREIGN PATENT DOCUMENTS

| | | | | |
|---|---|---|---|---|
| CN | 113220960 A * | 8/2021 | | G06N 3/048 |
| EP | 4346262 A1 * | 4/2024 | | H04W 24/02 |
| WO | WO-2022236064 A2 * | 11/2022 | | G05B 23/0243 |

OTHER PUBLICATIONS

Gautam Pal, Gangmin Li, and Katie Atkinson; (Big Data Real Time Ingestion and Machine Learning); pp. 7; IEEE Second International Conference on Data Stream Mining & Processing; Aug. 21-25 (Year: 2018).*

(Continued)

*Primary Examiner* — Ali H. Cheema
(74) *Attorney, Agent, or Firm* — Harrity & Harrity, LLP

(57) ABSTRACT

In some implementations, a system may receive, at a first type of data structure, a set of data elements of a data stream. The system may forward the set of data elements to a second type of data structure and a third type of data structure. The system may receive, based on forwarding the set of data elements to the second type of data structure and the third type of data structure, a query for machine learning training data. The system may transmit, to a computational element associated with a machine learning processing platform, information relating to the set of data elements to train a machine learning model, wherein the information includes timing information relating to a set of instances of each data element of the set of data elements.

19 Claims, 6 Drawing Sheets

(56) References Cited

U.S. PATENT DOCUMENTS

| | | | | |
|---|---|---|---|---|
| 2014/0078396 A1* | 3/2014 | Knutson | ............ | H04N 21/4381 |
| | | | | 348/500 |
| 2014/0280457 A1* | 9/2014 | Anton | ................... | G06F 16/245 |
| | | | | 709/202 |
| 2016/0321594 A1* | 11/2016 | Linde | .................... | G06F 11/008 |
| 2018/0203744 A1* | 7/2018 | Wiesmaier | ............. | G06F 9/505 |
| 2019/0138524 A1* | 5/2019 | Singh | ...................... | H04L 43/04 |
| 2019/0228006 A1* | 7/2019 | Tormasov | ............. | H04L 9/3239 |
| 2019/0258821 A1* | 8/2019 | Holmberg | ........... | G06F 21/6245 |
| 2020/0012892 A1* | 1/2020 | Goodsitt | ............. | G06F 11/3684 |
| 2021/0263945 A1* | 8/2021 | Siebel | ................... | G06F 16/254 |
| 2022/0394957 A1* | 12/2022 | James | .................... | G06N 20/00 |
| 2023/0073695 A1* | 3/2023 | Goodsitt | ............... | G06F 16/248 |
| 2023/0099749 A1* | 3/2023 | Togawa | ................. | G06Q 10/00 |
| | | | | 705/7.31 |
| 2023/0176557 A1* | 6/2023 | Cella | .................... | G05B 13/048 |
| | | | | 700/117 |
| 2023/0196101 A1* | 6/2023 | Ghanta | ................... | G06N 5/04 |
| | | | | 706/12 |

OTHER PUBLICATIONS

Stratos Idreos, Niv Dayan, Wilson Qin, Mali Akmanalp, Sophie Hilgard, Andrew Ross, James Lennon, Varun Jain, Harshita Gupta, David Li, and Zichen Zhu; (Learning Key-Value Store Design); pp. 27; Jul. 11 (Year: 2019).*

* cited by examiner

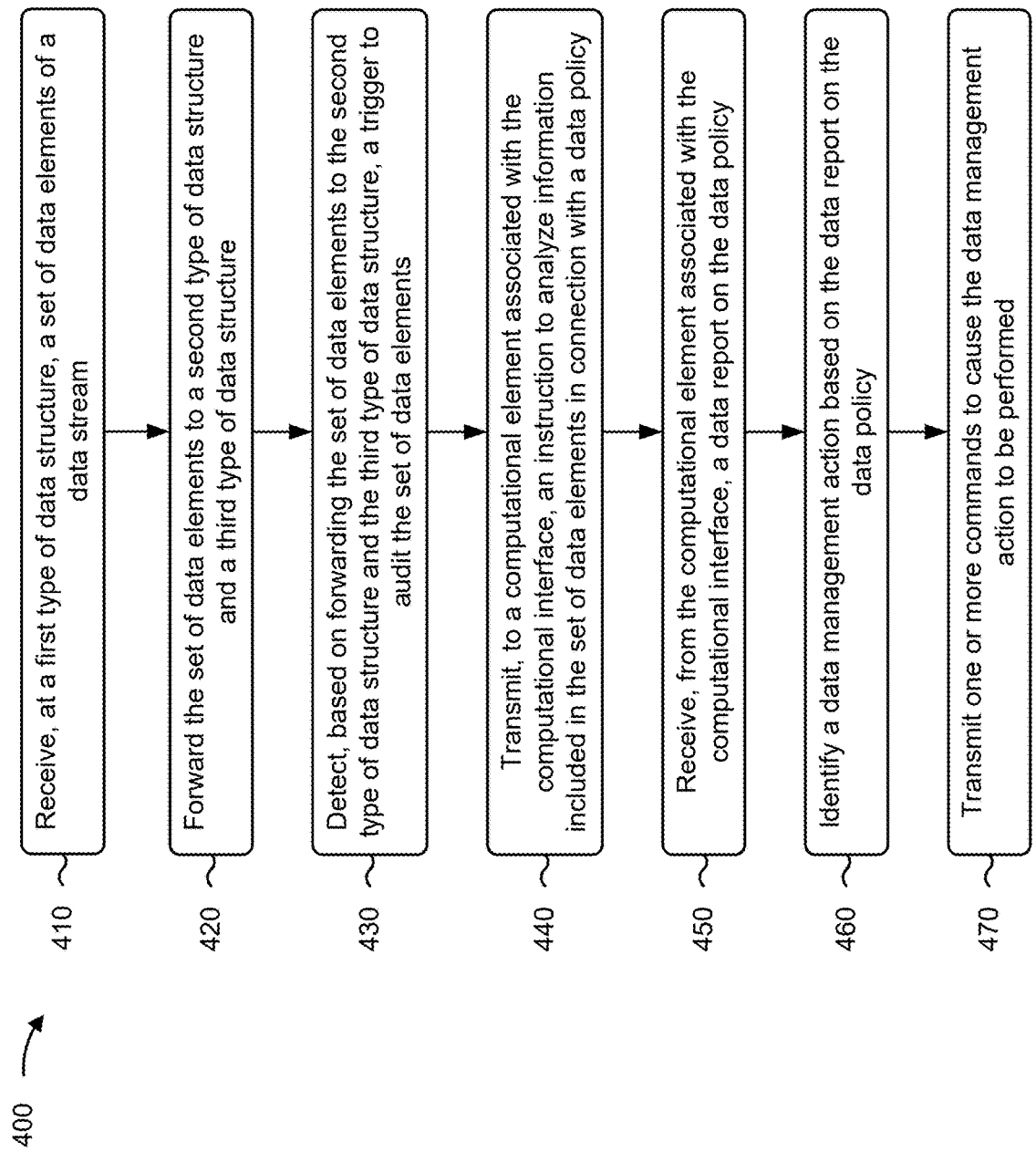

US 12,499,262 B2

REAL-TIME DATA EVALUATION FOR MODEL TRAINING AND EXECUTION

BACKGROUND

A data platform may perform an ingestion procedure to collect or absorb data into object storage. For example, from a streaming source, a data platform may perform continuous ingestion. In contrast, from a batch source, the data platform may perform periodic or triggered ingestion. Data platforms may make data available for further use, such as by exposing data application programming interfaces (APIs). A system may use an API to request and receive a dataset from the data platform, which may be used for generating a visualization, generating one or more metrics, or training a model, among other examples.

SUMMARY

Some implementations described herein relate to a system for data management. The system may include one or more memories and one or more processors communicatively coupled to the one or more memories. The one or more processors may be configured to receive, at a first type of data structure, a set of data elements of a data stream, wherein the set of data elements is associated with timing information identifying at least one of a first time at which each data element is received at the data structure or a second time at which each data element was generated. The one or more processors may be configured to forward the set of data elements to a second type of data structure and a third type of data structure, at least one of the second type of data structure or the third type of data structure being associated with a computational interface. The one or more processors may be configured to detect, based on forwarding the set of data elements to the second type of data structure and the third type of data structure, a trigger to audit the set of data elements. The one or more processors may be configured to transmit, to a computational element associated with the computational interface, an instruction to analyze information included in the set of data elements in connection with a data policy. The one or more processors may be configured to receive, from the computational element associated with the computational interface, a data report on the data policy. The one or more processors may be configured to identify a data management action based on the data report on the data policy. The one or more processors may be configured to transmit one or more commands to cause the data management action to be performed.

Some implementations described herein relate to a method. The method may include receiving, by a system and at a first type of data structure, a set of data elements of a data stream, wherein the set of data elements is associated with timing information identifying at least one of a first time at which each data element is received at the data structure or a second time at which each data element was generated. The method may include forwarding, by the system, the set of data elements to a second type of data structure and a third type of data structure, at least one of the second type of data structure or the third type of data structure being associated with a computational interface. The method may include receiving, based on forwarding the set of data elements to the second type of data structure and the third type of data structure, a query for machine learning training data. The method may include transmitting, by the system and to a computational element associated with a machine learning processing platform, information relating to the set of data elements to train a machine learning model, wherein the information includes timing information relating to a set of instances of each data element of the set of data elements.

Some implementations described herein relate to a non-transitory computer-readable medium that stores a set of instructions. The set of instructions, when executed by one or more processors of a system, may cause the system to receive a set of data elements from a data stream associated with a first type of data structure. The set of instructions, when executed by one or more processors of the system, may cause the system to store the set of data elements in a second type of data structure and a third type of data structure. The set of instructions, when executed by one or more processors of the system, may cause the system to detect, based on forwarding the set of data elements to the second type of data structure and the third type of data structure, a trigger to audit the set of data elements. The set of instructions, when executed by one or more processors of the system, may cause the system to transmit, to a computational element associated with the second type of data structure or the third type of data structure, an instruction to analyze information included in the set of data elements in connection with a data policy. The set of instructions, when executed by one or more processors of the system, may cause the system to receive, from the computational element, a data report on the data policy. The set of instructions, when executed by one or more processors of the system, may cause the system to identify a data management action based on the data report on the data policy. The set of instructions, when executed by one or more processors of the system, may cause the system to transmit one or more commands to cause the data management action to be performed.

BRIEF DESCRIPTION OF THE DRAWINGS

FIG. 4 is a flowchart of an example process associated with real-time data ingestion and model training, in accordance with some embodiments of the present disclosure.

DETAILED DESCRIPTION

The following detailed description of example implementations refers to the accompanying drawings. The same reference numbers in different drawings may identify the same or similar elements.

Some implementations described herein enable real-time data ingestion and model training. For example, some implementations described herein may perform real-time data auditing and may perform data streaming of audited data to enable training of machine learning models without compromising information security. As a result, machine learning (ML) models, large-language models (LLMs), or artificial intelligence (AI) models can be deployed with information security being maintained for private information in a dataset.

A data platform may receive data in real-time or as a set of batch communications. The data platform may ingest the data into a set of data structures and may expose a set of application programming interfaces (APIs) to make the data available from the set of data structures. Some data, which is received at the data platform, may include sensitive information, such as private data, personal identification data (e.g., demographic information), financial data (e.g., bank account or transactional data), medical data (e.g., care or treatment information), security data (e.g., user names and passwords), trade secret data (e.g., corporate secrets information), or another type of data. In some examples, sensitive information may be inadvertently included in a dataset that is provided to a data platform. Accordingly, when the data platform exposes a set of APIs for accessing data stored in data structures of the data platform, the data platform may inadvertently expose the sensitive information.

Some implementations described herein provide for real-time data ingestion and auditing to identify sensitive information and ensure that sensitive information is not exposed inadvertently. For example, a data management system may audit received data to identify sensitive information included in the received data and may remove the sensitive information from storage via a data structure that is exposed via an API or another technique. Additionally, or alternatively, the data management system may exclude sensitive information from datasets that are provided to, for example, application servers. For example, when datasets are generated for ML, AI, or LLMs, the data management system may expose a dataset that excludes sensitive information. In this way, the data management system improves information security for data systems.

Figure 1A:
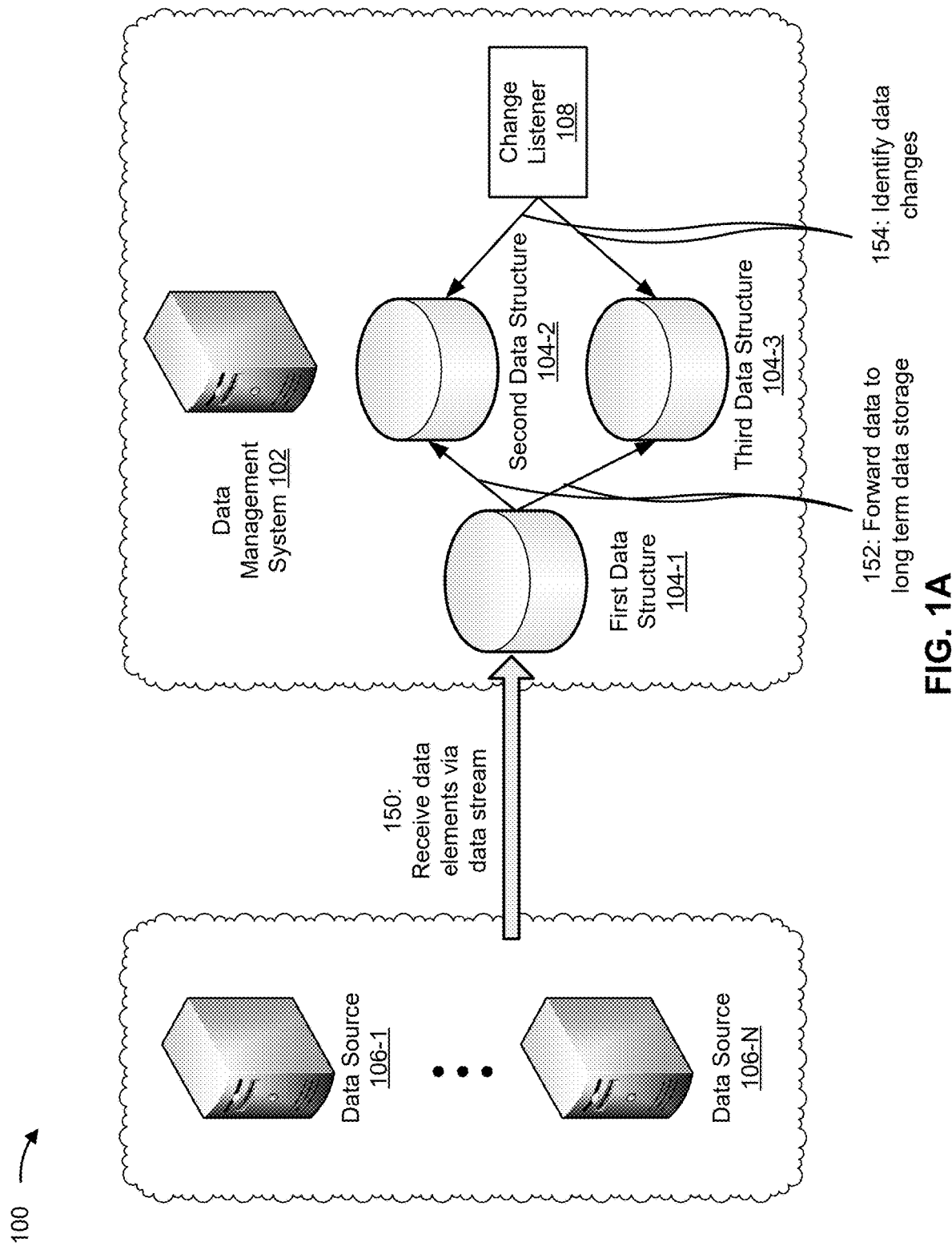
FIGS. 1A-1C are diagrams of an example associated with real-time data ingestion and model training, in accordance with some embodiments of the present disclosure.
Figure 1B:
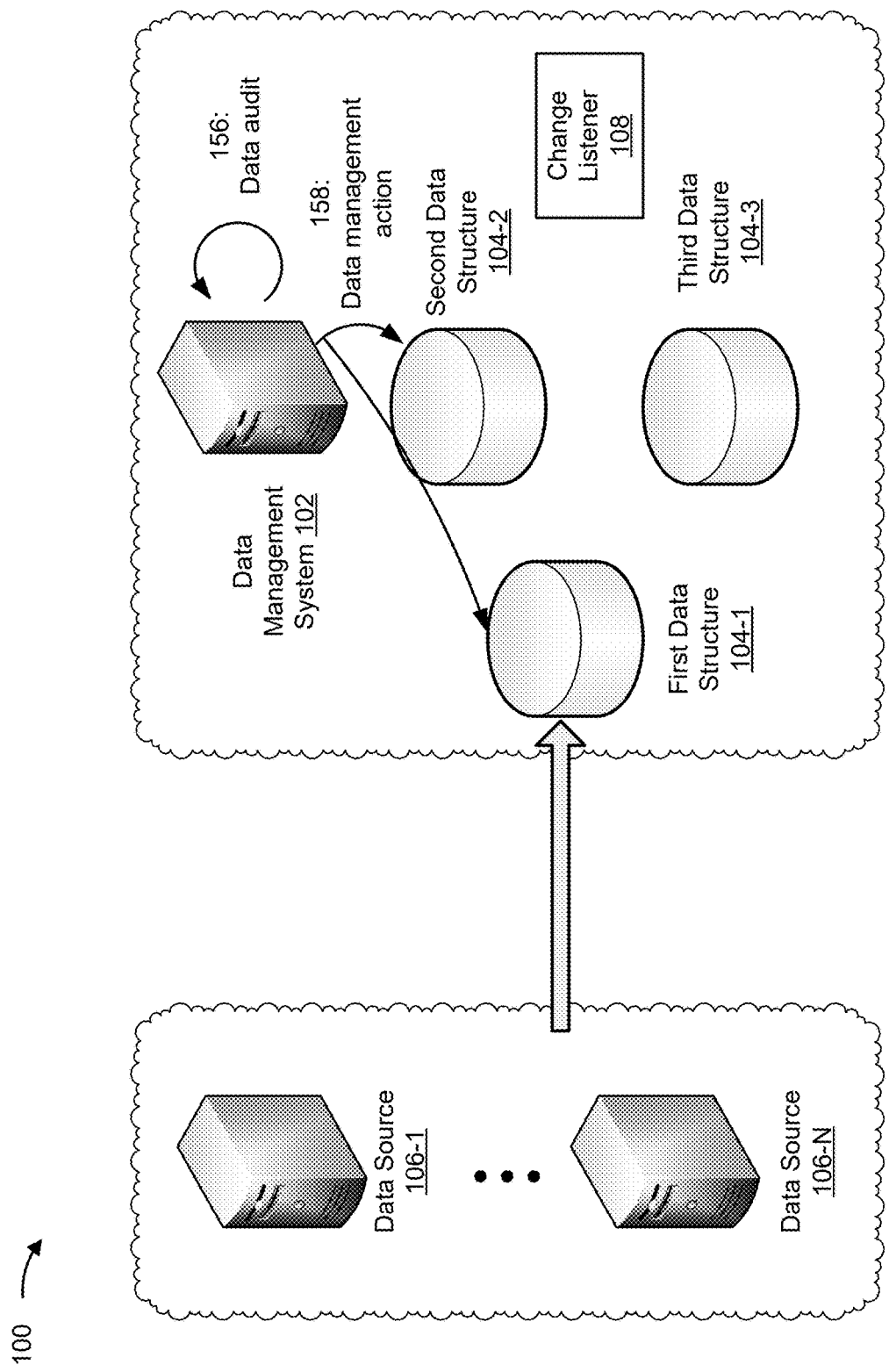
Figure 1C:
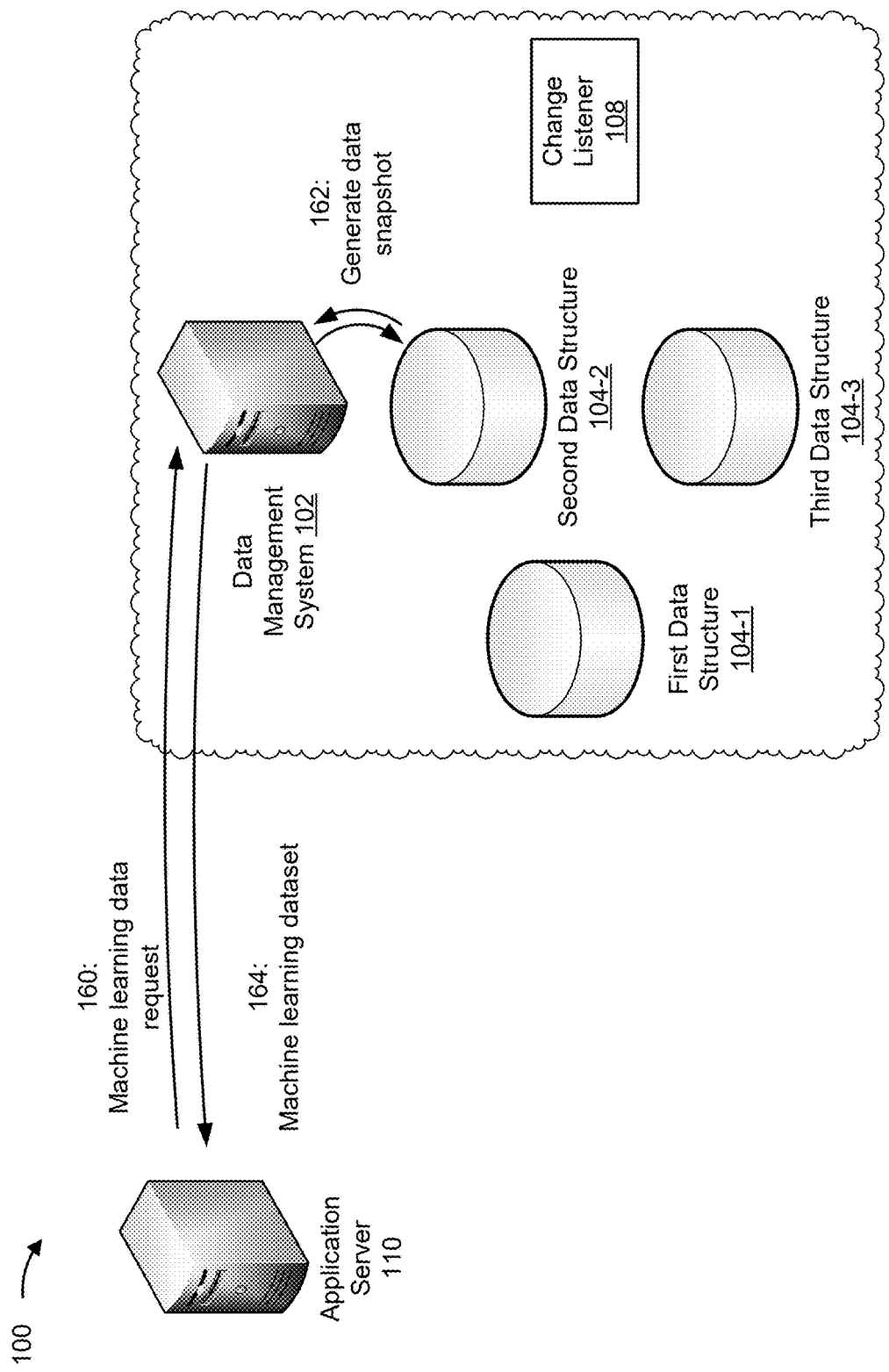

FIGS. 1A-1C are diagrams of an example 100 associated with real-time data ingestion and model training. As shown in FIGS. 1A-1C, example 100 includes a data management system 102, a set of data sources 106-1 through 106-N, and an application server 110. The data management system 102 may include a set of data structures 104-1 through 104-3 and a change listener 108.

As shown in FIG. 1A, and by reference number 150, the data management system 102 may receive a set of data elements via a data stream. For examples, data management system 102 may receive streaming data or batch data at the first data structure 104-1. A data element may include information, such as health information, security information, demographic information, financial information, or another type of information. In some implementations, a data element may be associated with timing information. For example, a data element may include a first portion that is a payload (e.g., financial information or health information) and a second portion that is a metadata or control information for the payload (e.g., information identifying a time at which the data element was generated or a time at which the data element was received at the data management system 102).

In some implementations, the data management system 102 may establish one or more data streams for receiving the set of data elements. For example, the data management system 102 may communicate with the set of data sources 106 to obtain data on a streaming basis or a periodic basis. Additionally, or alternatively, the data management system 102 may obtain data on an event basis. For example, when a data source 106 receives a new data element, the data source 106 may provide the new data element to the data management system 102 or may alert the data management system 102 to cause the data management system 102 to request the new data element.

As further shown in FIG. 1A, and by reference number 152, the data management system 102 may forward data to long term data storage at the second data structure 102-2 and/or the third data structure 104-3. For example, the data management system 102 may transfer to the set of data elements from a first type of data structure (e.g., the first data structure 104-1) to one or more second types of data structures (e.g., the second data structure 104-2 and/or the third data structure 104-3). In this case, the first type of data structure may include an ingestor component (or a queue thereof) that reads data entering into the data management system 102 (e.g., via a communications port) from the set of data sources 106. The ingestor imports the set of data elements for immediate use or processing and performs one or more functionalities, such as an extraction functionality, an analysis functionality, a data type identification functionality, a firewalling functionality, a batch processing functionality, or another functionality. In contrast, the one or more second types of data structures may be associated with long-term storage of the set of data elements. For example, the second data structure 104-2 may include a key-value datastore that stores the set of data elements using a key-value technique. Similarly, the third data structure 104-3 may include a relational datastore that stores the set of data elements using a relational database. In some implementations, a data structure 104 may include a graph data structure. For example, a data structure 104 may include a graph representation of data, such as a data lineage type of graph representation of a group of datasets being used or generated by a group of applications.

As further shown in FIG. 1A, and by reference number 154, the data management system 102 may identify data changes associated with data being stored at the second data structure 104-2 and/or the third data structure 104-3. For example, the data management system 102 may use the change listener 108 to identify new or altered data being stored at the second data structure 104-2 and/or the third data structure 104-3. In some implementations, the data management system 102 may identify a data change based on new data being added to a data structure 104. For example, when a data structure 104 receives a new data element, the data management system 102 may detect a data change. Additionally, or alternatively, the data management system 102 may detect a data change when a data structure 104 receives a new type of data, such as data associated with a new format, a new data type, a new data source, or another characteristic.

As shown in FIG. 1B, and by reference number 156, the data management system 102 may perform a data audit. For example, based on identifying data changes at the second data structure 104-2 and/or the third data structure 104-3, the data management system 102 may audit data at the second data structure 104-2 and/or the third data structure 104-3. In this case, by performing the data audit at the data management system 102 rather than at an application server 110, the data management system 102 frees up resources of the application server 110 to perform one or more other functionalities.

In some implementations, the data management system 102 may perform the data audit based on detecting a triggering event. For example, the data management system 102 may perform the data audit based on forwarding the set of data elements to the second data structure 104-2 and/or the third data structure 104-3. In some implementations, the data management system 102 may consolidate multiple events into a single consolidated event. For example, the data management system 102 may identify multiple events relating to multiple instances of a single data element over a configured period of time and may consolidate the multiple events into the single consolidated event. In this case, when the data management system 102 identifies and performs one or more event-based actions for the single consolidated event, the data management system 102 may perform the one or more event-based actions to fulfill the single consolidated event.

Additionally, or alternatively, the data management system 102 may perform the data audit in accordance with an offline auditing schedule. For example, the data management system 102 may perform periodic data audits in accordance with a configured periodicity. Additionally, or alternatively, the data management system 102 may perform a data audit when receiving a request for data. For example, when the data management system 102 receives a request for data stored in the second data structure 104-2 and/or the third data structure 104-3, the data management system 102 may perform a data audit to verify that provided data satisfies a data policy. The data policy may include a set of criteria for characterizing data, such as for characterizing data as sensitive information. Accordingly, the data management system 102 may perform the data audit to ensure that sensitive information is not provided to an unauthorized user or requester.

In some implementations, the data management system 102 may analyze the set of data elements or data changes associated therewith to identify one or more violations of a data policy. For example, the data management system 102 may determine that the set of data elements includes sensitive information, such as financial information, health information, demographic information, trade secret information, security information, or another type of sensitive information.

In some implementations, the data management system 102 may determine that the set of data elements includes sensitive information based on analyzing a content of the set of data elements. For example, the data management system 102 may parse a data element to determine that a type of information included in the data element is a user name and password for a user. Additionally, or alternatively, the data management system 102 may parse a data element to determine that a type of information included in the data element is a personal address associated with a mortgage applicant. Additionally, or alternatively, the data management system 102 may parse a data element to determine that a type of information included in the data element is a treatment plan for a patient.

In some implementations, the data management system 102 may determine that the set of data elements includes sensitive information based on a source of the set of data elements. For example, the data management system 102 may determine that a particular data source 106 is associated with storing and/or providing sensitive information and may determine that all data (or a subset of data) received from the particular data source 106 is to be classified as sensitive information in accordance with a data policy (e.g., which may have one or more criteria characterizing sensitive information). In some implementations, the data management system 102 may use a sensitive data library to identify sensitive information. For example, the data management system 102 may access a data structure (e.g., the sensitive data library) identifying types of sensitive data and may analyze the set of data elements (e.g., using a machine learning technique) to determine a similarity score between the set of data elements and a type of sensitive data. The similarity score may be based on the data source 106, a data content, a set of variables, a size of a data element, a format of a data element, a type of application server 110 requesting the data element for machine learning training, or another factor. In this case, when the similarity score satisfies a threshold level, the data management system 102 may classify a data element as including sensitive information.

In some implementations, the data management system 102 may determine that the set of data elements includes sensitive information based on correlating different data elements. For example, the data management system 102 may receive a first dataset identifying patient names and unique identifiers and a second dataset identifying patient treatment plans and unique identifiers. In this case, the first dataset and the second dataset, separately, may not be considered sensitive information according to a data policy, but together may be considered sensitive information according to the data policy (e.g., based on being able to correlate the patient names with the patient treatment plans using the common unique identifiers). Accordingly, the data management system 102 may, when receiving the second dataset, determine that the second dataset is sensitive information when combined with the first dataset.

In some implementations, the data management system 102 may use timing information to perform the data audit. For example, the data management system 102 may identify changes or trends associated with the set of data elements using the timing information associated with the set of data elements. In this case, the data management system 102 may simulate or recreate one or more events (e.g., past states) associated with the set of data elements to determine whether a data policy is satisfied, a trend is observed, or another criteria has occurred that corresponds to a particular data management action.

In some implementations, the data management system 102 may detect a data error when performing a data audit. For example, the data management system 102 may determine that the set of data elements is associated with an incorrect format (e.g., a format that differs from an expected format). Additionally, or alternatively, the data management system 102 may determine that a data element does not include valid data, such as a data element being blank.

In some implementations, the data management system 102 may detect a suspicious activity. For example, the data management system 102 may detect, based on multiple instances of a data event (e.g., a request for a data element or a change to a data element) that a suspicious behavior is occurring. In this case, the data management system 102 may generate a flag for the data element relating to the suspicious activity, store the flag in connection with the data event, and/or perform a data management action as a response to generating the flag.

As further shown in FIG. 1B, and by reference number 158, the data management system 102 may perform a data management action. For example, the data management system 102 may identify a data management action based on a result of the data audit and may transmit a command or instruction to cause the data management action to be performed. In some implementations, the data management system 102 may determine or select a data management action relating to correcting a data error. For example, the data management system 102 may transmit a command to alter or correct a format of data determined to have an incorrect format. Additionally, or alternatively, the data management system 102 may transmit a command to remove a blank or invalid data element.

In some implementations, the data management system 102 may determine a data management action relating to a data removal. For example, the data management system 102 may remove one or more data elements that violate a data policy (e.g., by including sensitive information) from the second data structure 104-2 or the third data structure 104-3. Additionally, or alternatively, the data management system 102 may determine a data management action relating to data anonymization. For example, the data management system 102 may apply one or more data anonymization techniques (e.g., data redaction, data masking, generalization, data tokenization, data remediation, insertion or generation of synthetic data, pseudonymization, data swapping, or data perturbation, among other examples) to the set of data elements. In this case, the data management system 102 may generate a new set of data elements based on applying the one or more data anonymization techniques to an original set of data elements, and may store or provide the new set of data elements in the second data structure 104-2 and/or the third data structure 104-3 rather than the original set of data elements.

Additionally, or alternatively, the data management system 102 may determine or select a data management action relating to access privileges or access control. For example, the data management system 102 may tag data as being available to users or application servers 110 with a particular access privilege or level of access control. In some implementations, the data management system 210 may configure an access control policy, such that users without the particular access privilege or level of access control cannot receive sensitive information or private data. In this case, when the data management system 102 receives a request for the set of data elements from a user or application server 110 without the particular access privilege, the data management system 102 omit the set of data elements from a response or may provide anonymized data rather than the set of data elements.

In some implementations, the data management system 102 may determine a data management action relating to reporting. For example, the data management system 102 may generate a report of sensitive information stored in the second data structure 104-2 and/or the third data structure 104-3 and may transmit the report to a reporting entity to satisfy a compliance requirement. Additionally, or alternatively, the data management system 102 may tag sensitive information with a retention time period and may remove sensitive information after the retention time period has ended. In another example, the data management system 102 may quarantine the sensitive information until a quarantine period has ended. For example, the data management system 102 may determine that financial information cannot be used for a particular period of time or until a particular event has occurred, and may prevent the financial information from being accessed until the particular period of time has elapsed or the particular event has occurred.

In some implementations, the data management system 102 may generate a log or data report as a result of a data audit. For example, the data management system 102 may generate a log representing a set of changes detected in a data structure 104, a set of modifications to data included in a data structure 104, a state of a data structure 104 at a particular time instance, detected sensitive information, or another result of performing the data audit. In some implementations, the data management system 102 may generate a data report identifying a presence of sensitive information or private data in a dataset.

As shown in FIG. 1C, and by reference number 160, the data management system 102 may receive a machine learning data request. For example, the application server 110 may attempt to obtain data from the second data structure 104-2 and/or the third data structure 104-3 to use for machine learning training or calculation. In some implementations, the data management system 102 may receive a request to onboard a machine learning model. For example, the application server 110 may determine that a new machine learning model is to be added to a data system that includes the application server 110 and the data management system 102. In this case, the data management system 102 may determine to export a dataset to the application server 110 to enable the application server 110 to train the machine learning model and provide access to the machine learning model via the data system.

As further shown in FIG. 1C, and by reference number 162, the data management system 102 may generate a data snapshot. For example, based on receiving the machine learning data request, the data management system 102 may access the second data structure 104-2 and/or the third data structure 104-3 and generate information relating to data being stored at the second data structure 104-2 and/or the third data structure 104-3. A data snapshot may include a representation of a data structure 104 at or during a particular time interval. For example, the data snapshot may represent a state of one or more data elements at a particular time, such as at a time when the request for data was received, a time when the request for data was generated, or another time (e.g., an arbitrary past time selected to perform back-testing, as described herein).

In some implementations, the data snapshot may be associated with timing information of the set of data elements. For example, the data management system 102 may use the timing information to generate information identifying a content of the second data structure 104-2 and/or the third data structure 104-3 at a particular time. In other words, the data management system 102 may provide information identifying what data was available at a particular past instance of time, thereby enabling compliance auditing of past instances. Additionally, or alternatively, the data management system 102 may use the timing information to track data change events, which may be used for replaying or recreating past data scenarios for compliance auditing or machine learning back-testing.

In some implementations, the data management system 102 may generate the data snapshot to represent a particular instance of a data element. For example, the data management system 102 may, using the set of data structures 104, store multiple instances of a data element associated with multiple different time periods of time instances. In this case, the data management system 102 may generate information identifying a state or trend of the data element over a configured period of time, which may include one or more different instances or versions of the data element. In other words, a data structure 104 may store an audit log of changes to a data element based on timing information associated with the data element, and the data management system 102 may use the audit log to identify a state of the data element over a particular configured time interval.

In some implementations, the data management system 102 may use computing resources allocated to the second data structure 104-2 and/or the third data structure 104-3 to fulfill a request. For example, the second data structure 104-2 may be allocated with one or more computational elements or interfaces for performing analytics on data therein and/or providing access to the data therein. In this case, the data management system 102 may transmit one or more commands to the one or more computational elements or interfaces to cause the one or more computational elements or interfaces to perform a data management action or fulfill a request using a functionality of the one or more computational elements or interfaces. This may obviate a need for the data management system 102 or may different application servers 110 to replicate a functionality, such as analytics functionalities, that is provided with the second data structure 104-2.

As further shown in FIG. 1C, and by reference number 164, the data management system 102 may transmit a machine learning dataset as a response to the machine learning data request. For example, the data management system 102 may use the data snapshot to generate a machine learning dataset and may export the machine learning dataset to the application server 110. In some implementations, the data management system 102 may provide data for offline use by the application server 110. For example, the data management system 102 may generate a copy of data stored in a data structure 104 and may provide the copy to the application server 110. Additionally, or alternatively, the data management system 102 may perform a data audit on the offline copy to attempt to identify a data issue, such as a presence of sensitive information, a format or type error associated with data, or another type of issue.

In some implementations, the application server 110 may perform a machine learning functionality using a dataset received from the data management system 102. For example, the application server 110 may train a machine learning model and use the machine learning model to perform a prediction when new data is received. In this case, the application server 110 (or the data management system 102) may provide output information identifying a result of performing the prediction. Additionally, or alternatively, the application server 110 may apply a trained machine learning model to the dataset to perform a prediction using the dataset.

As indicated above, FIGS. 1A-1C are provided as an example. Other examples may differ from what is described with regard to FIGS. 1A-1C.

Figure 2:
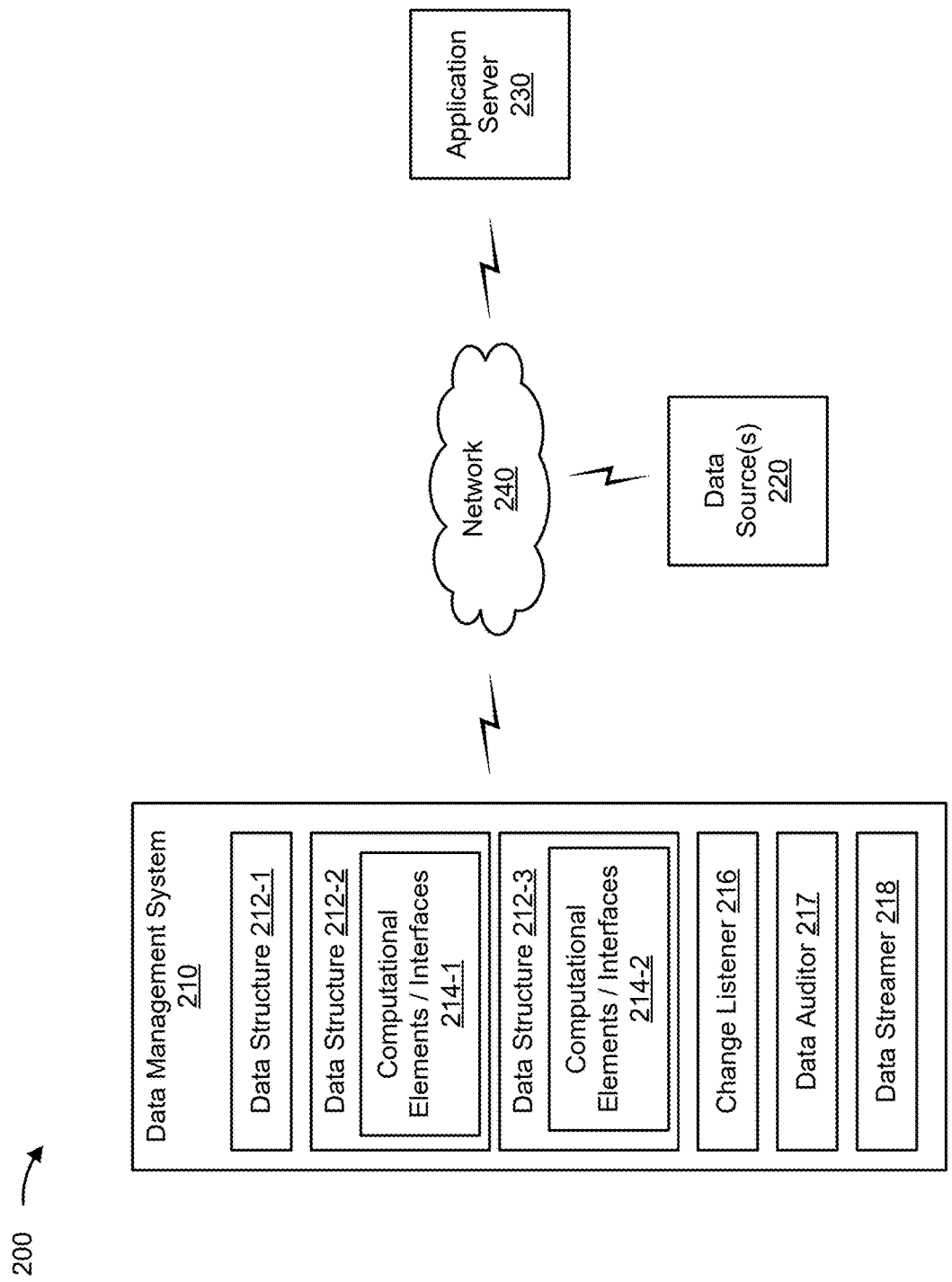
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a data management system 210, one or more data sources 220, an application server 230, and a network 240. Devices of environment 200 may interconnect via wired connections, wireless connections, or a combination of wired and wireless connections.

The data management system 210 may include one or more devices capable of receiving, generating, storing, processing, providing, and/or routing information associated with real-tie data ingestion and auditing, as described elsewhere herein. The data management system 210 may include a communication device and/or a computing device. For example, the data management system 210 may include a server, such as an application server, a client server, a web server, a database server, a host server, a proxy server, a virtual server (e.g., executing on computing hardware), or a server in a cloud computing system. In some implementations, the data management system 210 may include computing hardware used in a cloud computing environment. In some implementations, the data management system 210 may correspond to the data management system 102 described with regard to FIGS. 1A-1C.

In some implementations, the data management system 210 may include a set of data structures 212, such as a data structure 212-1, a data structure 212-2, and/or a data structure 212-3, among other examples. For example, the data management system 210 may include a first data structure 212 (e.g., the data structure 212-1) that is used to receive data from the data sources 220. In this case, the first data structure 212 may be associated with an ingestion layer for scanning or receiving data from the data sources 220. Additionally, or alternatively, the data management system 210 may include a second data structure 212 (e.g., the data structure 212-2) and a third data structure 212 (e.g., the data structure 212-3). In this case, the data management system 210 may perform an audit of data received at the first data structure 212 and may route the audited data to the second data structure 212 and/or the third data structure 212.

In some implementations, the second data structure 212 and/or the third data structure 212 may be associated with computational elements/interfaces 214 (e.g., a computation element/interface 214-1 and/or a computational element/interface 214-2, respectively). The computational elements/interfaces 214 may include one or more computing resources allocated to performing one or more functions in connection with, for example, the second data structure 212 and the third data structure 212. For example, the second data structure 212 may be a first type of cloud data platform that the data management system 210 uses for data storage and that provides a data-as-a-service (DaaS) functionality. In this case, the computational elements/interfaces 214-1 provide resources for the DaaS functionality, which includes one or more interfaces and computing functionalities for generating information relating to the data, such as generating visualizations of the data, performing computations on the data, and/or facilitating retrieval of the data. Similarly, the third data structure 212 may include a data lake, which may be a centralized repository for storing, processing, and securing large amounts of structured, semi-structured, or unstructured data. Accordingly, the computational elements/interfaces 214-2 provide resources for the processing capabilities of the data lake.

In some implementations, the data management system 210 may include a change listener 216. The change listener 216 may track data changes associated with the data sources 220. For example, the change listener 216 may include one or more computing resources allocated to receiving updates regarding the data sources 220, querying the data sources 220 for the updates, or determining whether an update exists with respect to the data sources 220 (e.g., by comparing data obtained from the data sources 220 with data available at the data sources 220). In some implementations, the data management system 210 may include a data auditor 217. The data auditor 217 may perform a data audit on data received at the data management system 210. For example, when data is ingested at the data structure 212-1, the data auditor 217 may evaluate the data before the data is forwarded to the data structures 212-2 and 212-3, as described in more detail herein. In some implementations, the data management system 210 may include a data streamer 218. The data streamer 218 may provide or export data to an application server 230. For example, the data streamer 218 may generate datasets for machine learning (ML) or artificial intelligence (AI) training and/or for executing an ML or AI model.

The data source 220 may include one or more devices capable of receiving, generating, storing, processing, and/or providing information associated with an application or service, as described elsewhere herein. The data source 220 may include a communication device and/or a computing device. For example, the data source 220 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data source 220 may communicate with one or more other devices of environment 200, as described elsewhere herein. In some implementations, the data sources 220 may correspond to the data sources 106 described with regard to FIGS. 1A-1C.

The application server 230 may include one or more devices capable of receiving, generating, storing, processing, providing, and/or routing information associated with providing an application or data service, as described elsewhere herein. The application server 230 may include a communication device and/or a computing device. For example, the application server 230 may include a server, such as a client server, a web server, a database server, a host server, a proxy server, a virtual server (e.g., executing on computing hardware), or a server in a cloud computing system. In some implementations, the application server 230 may be associated with providing a machine learning model trained using a dataset. In some implementations, the application server 230 may include computing hardware used in a cloud computing environment. In some implementations, the application server 230 may correspond to the application server 110 described with regard to FIGS. 1A-1C.

The network 240 may include one or more wired and/or wireless networks. For example, the network 240 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 240 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
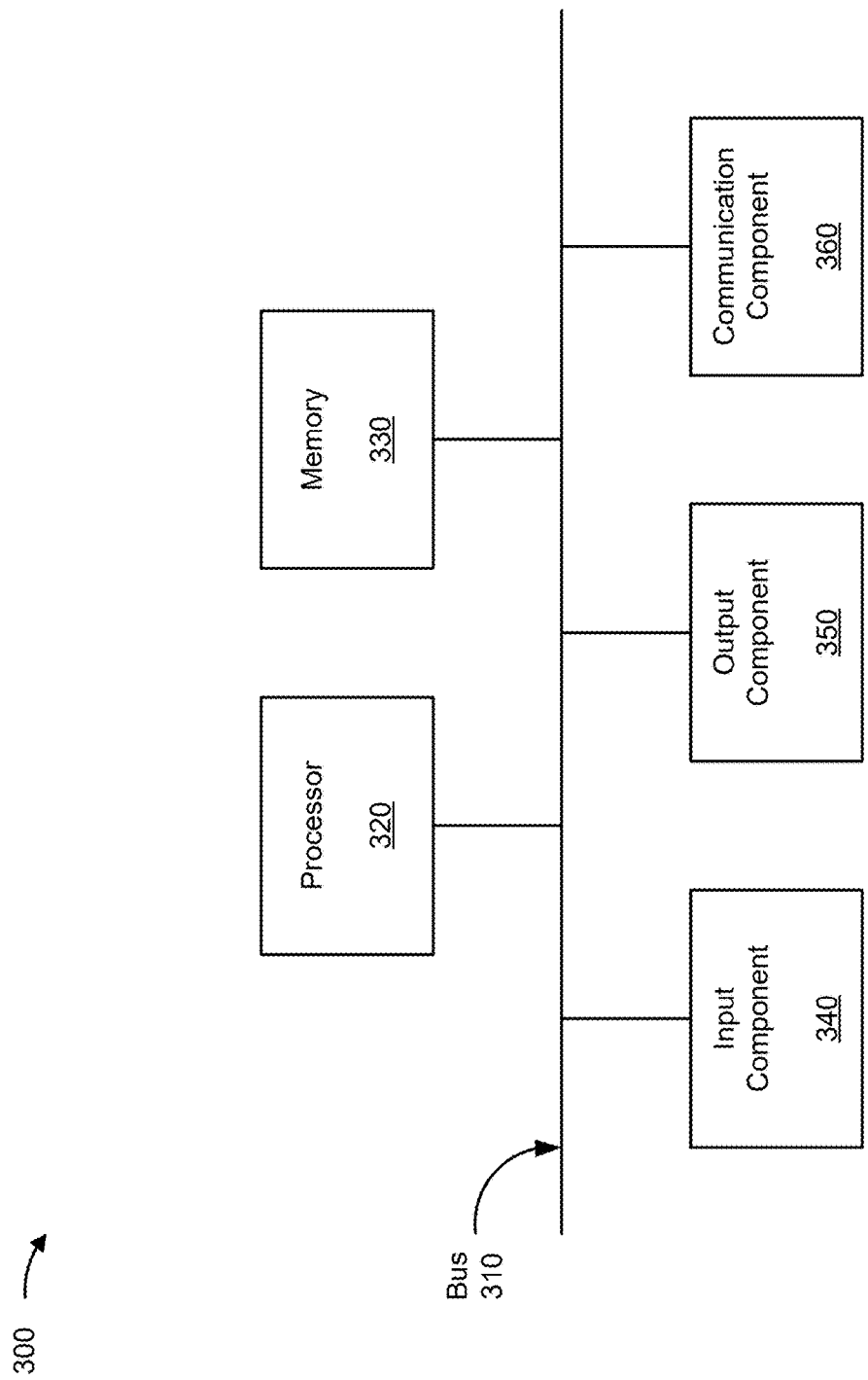
FIG. 3 is a diagram of example components of a device associated with real-time data ingestion and model training, in accordance with some embodiments of the present disclosure.

FIG. 3 is a diagram of example components of a device 300 associated with real-time data ingestion and model training. The device 300 may correspond to data management system 210, data source 220, and/or application server 230. In some implementations, data management system 210, data source 220, and/or application server 230 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 associated with real-time data ingestion and model training. In some implementations, one or more process blocks of FIG. 4 may be performed by the data management system 210. In some implementations, one or more process blocks of FIG. 4 may be performed by another device or a group of devices separate from or including the data management system 210, such as the data source 220 and/or the application server 230. In some implementations, one or more process blocks of FIG. 4 may be performed by or at a component of the data management system 210, such as the data structures 212, the change listener 216, the data auditor 217, and/or the data streamer 218. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include receiving, at a first type of data structure, a set of data elements of a data stream (block 410). For example, the data management system 210 (e.g., using processor 320, memory 330, input component 340, and/or communication component 360) may receive, at a first type of data structure, a set of data elements of a data stream, as described above in connection with reference number 150 of FIG. 1A. In some implementations, the set of data elements is associated with timing information identifying at least one of a first time at which each data element is received at the data structure or a second time at which each data element was generated. As an example, the data management system 210 may receive data in a particular format from a data source as a data stream or a batch process.

As further shown in FIG. 4, process 400 may include forwarding the set of data elements to a second type of data structure and a third type of data structure, at least one of the second type of data structure or the third type of data structure being associated with a computational interface (block 420). For example, the data management system 210 (e.g., using processor 320 and/or memory 330) may forward the set of data elements to a second type of data structure and a third type of data structure, at least one of the second type of data structure or the third type of data structure being associated with a computational interface, as described above in connection with reference number 152 of FIG. 1A. As an example, the data management system 210 may forward the set of data elements from a short-term storage (e.g., an ingestor) to a long-term storage (e.g., a relational data structure, a key-value data structure, a data lake, or another type of data structure that is associated with one or more computational elements providing one or more functionalities).

As further shown in FIG. 4, process 400 may include detecting, based on forwarding the set of data elements to the second type of data structure and the third type of data structure, a trigger to audit the set of data elements (block 430). For example, the data management system 210 (e.g., using processor 320 and/or memory 330) may detect, based on forwarding the set of data elements to the second type of data structure and the third type of data structure, a trigger to audit the set of data elements, as described above in connection with reference numbers 154 and 156 of FIGS. 1A and 1B, respectively. As an example, the data management system 210 may detect a data change using a querying procedure or a component assigned to monitor a data structure.

As further shown in FIG. 4, process 400 may include transmitting, to a computational element associated with the computational interface, an instruction to analyze information included in the set of data elements in connection with a data policy (block 440). For example, the data management system 210 (e.g., using processor 320, memory 330, and/or communication component 360) may transmit, to a computational element associated with the computational interface, an instruction to analyze information included in the set of data elements in connection with a data policy, as described above in connection with reference number 156 of FIG. 1B. As an example, the data management system 210 may transmit an instruction to cause a computational element associated with a data structure to perform one or more tasks, such as analyzing a data element or generating analytics regarding a data element.

As further shown in FIG. 4, process 400 may include receiving, from the computational element associated with the computational interface, a data report on the data policy (block 450). For example, the data management system 210 (e.g., using processor 320, memory 330, input component 340, and/or communication component 360) may receive, from the computational element associated with the computational interface, a data report on the data policy, as described above in connection with reference number 156 of FIG. 1B. As an example, the data management system 210 may receive results of transmitting the command, such as receiving the data element or analytics regarding the data element.

As further shown in FIG. 4, process 400 may include identifying a data management action based on the data report on the data policy (block 460). For example, the data management system 210 (e.g., using processor 320 and/or memory 330) may identify a data management action based on the data report on the data policy, as described above in connection with reference number 156 of FIG. 1B. As an example, the data management system 210 may determine to anonymize data determined to include sensitive information.

As further shown in FIG. 4, process 400 may include transmitting one or more commands to cause the data management action to be performed (block 470). For example, the data management system 210 (e.g., using processor 320, memory 330, and/or communication component 360) may transmit one or more commands to cause the data management action to be performed, as described above in connection with reference number 158 of FIG. 1B. As an example, data management system 210 may transmit an instruction to a data structure to anonymize the data determined to include sensitive information.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1C. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for data management, the system comprising:
one or more memories; and
one or more processors, communicatively coupled to the one or more memories, configured to:
   receive, at a first type of data structure via device network, a set of data elements of a data stream, wherein the set of data elements is associated with timing information identifying at least one of a first time at which each data element is received at the first type of data structure and/or a second time at which each data element was generated;
   forward the set of data elements to a second type of data structure and a third type of data structure, at least one of the second type of data structure or the third type of data structure being associated with a computational interface;
   detect, based on forwarding the set of data elements to the second type of data structure and the third type of data structure, a trigger to audit the set of data elements,
      wherein the first type of data structure is an ingestor that reads data from the data stream, the second type of data structure is a key-value data structure, and the third type of data structure is a relational data structure;
   transmit, to a computational element associated with the computational interface, an instruction to analyze information included in the set of data elements in connection with a data policy,
      wherein the information includes timing information relating to a set of instances of each data element of the set of data elements;
   receive, from the computational element associated with the computational interface, a data report on the data policy;
   identify a data management action based on the data report on the data policy; and transmit, over the device network, one or more commands to cause the data management action to be performed, wherein the one or more processors, to transmit the one or more commands, are configured to transmit a set of alerts indicating a characteristic of the set of data elements associated with the data report.

2. The system of claim 1, wherein the one or more processors, to identify the data management action, are configured to:
select a particular data management action relating to anonymization based on the data report indicating a presence of private data in the set of data elements; and
wherein the one or more processors, to transmit the one or more commands, are configured to:
transmit a command to anonymize one or more data elements of the set of data elements based on the presence of private data in the set of data elements.

3. The system of claim 1, wherein the one or more processors, to identify the data management action, are configured to:
select a particular data management action relating to access control based on the data report indicating a presence of private data in the set of data elements; and
wherein the one or more processors, to transmit the one or more commands, are configured to:
configure an access control policy for access to one or more data elements of the set of data elements based on the presence of private data in the set of data elements.

4. The system of claim 1, wherein the one or more processors, to identify the data management action, are configured to:
select a particular data management action relating to model training based on the data report indicating that the set of data elements satisfies one or more criteria; and
wherein the one or more processors, to transmit the one or more commands, are configured to:
transmit a command to train a machine learning model based on the set of data elements satisfying the one or more criteria.

5. The system of claim 1, wherein the one or more processors, to identify the data management action, are configured to:
select a particular data management action relating to model training based on the data report indicating an error in the set of data elements; and
wherein the one or more processors, to transmit the one or more commands, are configured to:
transmit a command to modify one or more data elements, of the set of data elements, to correct the error.

6. The system of claim 1, wherein the one or more processors are configured to track data changes associated with one or more data sources related to the data stream.

7. A method, comprising:
receiving, by a system via device network, at a first type of data structure, a set of data elements of a data stream, wherein the set of data elements is associated with timing information identifying at least one of a first time at which each data element is received at the first type of data structure and/or a second time at which each data element was generated;
forwarding, by the system, the set of data elements to a second type of data structure and a third type of data structure, at least one of the second type of data structure or the third type of data structure being associated with a computational interface,
wherein the first type of data structure is an ingestor that reads data from the data stream, the second type of data structure is a key-value data structure, and the third type of data structure is a relational data structure;
receiving, based on forwarding the set of data elements to the second type of data structure and the third type of data structure, a query for machine learning training data;
transmitting, by the system and to a computational element associated with a machine learning processing platform, information relating to the set of data elements to train a machine learning model,
wherein the information includes timing information relating to a set of instances of each data element of the set of data elements;
receiving, by the system and from the computational element associated with the machine learning processing platform, the machine learning model trained based on the information relating to the set of data elements;
providing new data, relating to the set of data elements, into the machine learning model to generate a prediction; and
providing output information associated with the prediction.

8. The method of claim 7, wherein receiving the query for machine learning training data comprises:
receiving a request to onboard the machine learning model;
generating a snapshot of the second type of data structure or the third type of data structure; and
wherein transmitting the information relating to the set of data elements comprises:
exporting the snapshot for training the machine learning model.

9. The method of claim 8, wherein the snapshot is an instance of the second type of data structure or the third type of data structure during a particular time interval.

10. The method of claim 7, further comprising:
receiving a query relating to a particular data element; and
transmitting information identifying a plurality of instances of the particular data element over a configured period of time.

11. The method of claim 7, wherein the second type of data structure or the third type of data structure stores an audit log of changes to each data element of the set of data elements.

12. The method of claim 7, further comprising:
identifying a plurality of events relating to a plurality of instances of a single data element over a configured period of time;
consolidating the plurality of events into a single consolidated event based on identifying the plurality of events; and
performing one or more event-based actions for the single consolidated event.

13. The method of claim 7, wherein the system comprises a component that tracks data changes associated with one or more data sources related to the data stream.

14. A non-transitory computer-readable medium storing a set of instructions, the set of instructions comprising:
one or more instructions that, when executed by one or more processors of a system, cause the system to:
receive, via device network, a set of data elements from a data stream associated with a first type of data structure, wherein the set of data elements is associated with timing information identifying at least one of a first time at which each data element is received at the first type of data structure and/or a second time at which each data element was generated;

forward and store the set of data elements in a second type of data structure and a third type of data structure being associated with a computational interface;

detect, based on forwarding the set of data elements to the second type of data structure and the third type of data structure, a trigger to audit the set of data elements, wherein the first type of data structure is an ingestor that reads data from the data stream, the second type of data structure is a key-value data structure, and the third type of data structure is a relational data structure;

transmit, to a computational element associated with the computational interface, an instruction to analyze information included in the set of data elements in connection with a data policy, wherein the information includes timing information relating to a set of instances of each data element of the set of data elements;

receive, from the computational element, a data report on the data policy;

identify a data management action based on the data report on the data policy; and transmit, via the device network, one or more commands to cause the data management action to be performed, wherein the one or more instructions, that cause the system to transmit the one or more commands, cause the system to transmit a set of alerts indicating a characteristic of the set of data elements associated with the data report.

15. The non-transitory computer-readable medium of claim 14, wherein the one or more instructions further cause the system to:

detect, based on a plurality of instances of a data event over a configured period of time, a suspicious activity;

generate a flag for the data element relating to the suspicious activity; and store the flag in connection with the data event based on generating the flag.

16. The non-transitory computer-readable medium of claim 14, wherein the one or more instructions, that cause the system to identify the data management action, cause the system to:

select a particular data management action relating to anonymization based on the data report indicating a presence of private data in the set of data elements; and wherein the one or more instructions, that cause the system to transmit the one or more commands, cause the system to:

transmit, based on the presence of private data in the set of data elements, a command to anonymize one or more data elements of the set of data elements or control access to the one or more data elements.

17. The non-transitory computer-readable medium of claim 14, wherein the one or more instructions, that cause the system to identify the data management action, cause the system to:

select a particular data management action relating to model training based on the data report indicating that the set of data elements satisfies one or more criteria; and wherein the one or more instructions, that cause the system to transmit the one or more commands, cause the system to:

transmit a command to train a machine learning model based on the set of data elements satisfying the one or more criteria.

18. The non-transitory computer-readable medium of claim 14, wherein the one or more instructions further cause the system to:

receive a request to onboard a machine learning model to a data platform associated with the set of data elements;

generate a snapshot of the second type of data structure or the third type of data structure; and export the snapshot for training the machine learning model.

19. The non-transitory computer-readable medium of claim 14, wherein the one or more instructions further cause the system to track data changes associated with one or more data sources related to the data stream.

* * * * *